Figure 1:
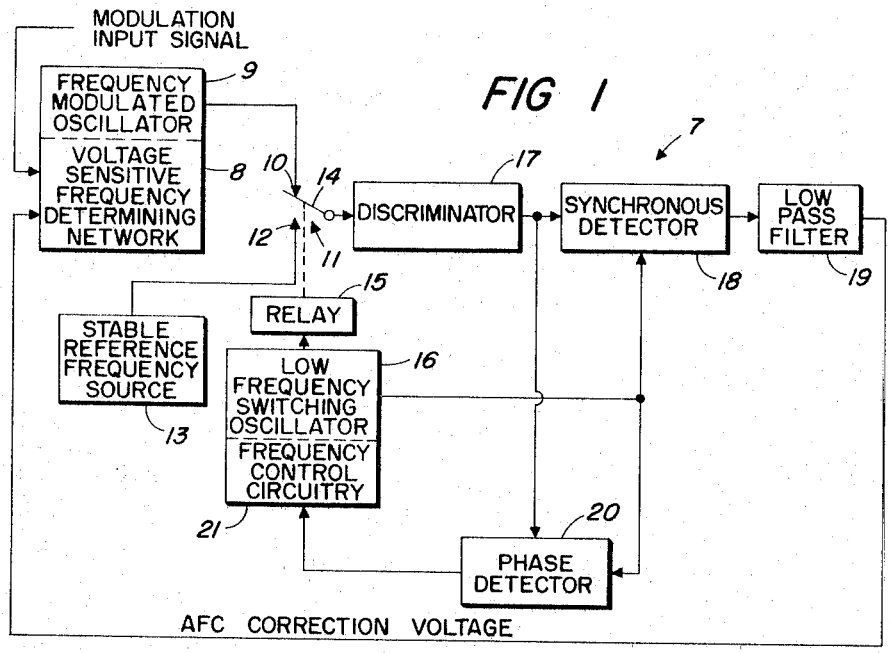

INVENTOR.
GEORGE E. CHADIMA II
BY
*Moody and Harris*
ATTORNEYS

United States Patent Office 3,297,965
Patented Jan. 10, 1967

3,297,965
FREQUENCY CONTROL SYSTEM HAVING PHASE CONTROLLED SAMPLING MEANS
George E. Chadima II, Cedar Rapids, Iowa, assignor to Collins Radio Company, Cedar Rapids, Iowa, a corporation of Iowa
Filed Oct. 9, 1963, Ser. No. 315,030
6 Claims. (Cl. 332—19)

This invention relates to an automatic frequency control system and more particularly to a sampling type automatic frequency control system having a phase controlled sampling means whereby said system is capable of eliminating error in compensation of carrier frequency due to the presence of continuous tones in received modulating signals that are odd-harmonically related to the sampling frequency.

Automatic frequency control (AFC) systems are well known in the electronics art, and are quite widely used to maintain a high frequency oscillator at a predetermined desired frequency. One of the better known methods for accomplishing automatic frequency control is a sampling method wherein the output frequency of the oscillator to be frequency stabilized is compared with a reference source that produces the desired frequency output by periodically switching between the two frequency sources.

While automatic frequency control circuits of the sampling type have been known and utilized for some time, and while various improvements to the basic system have been brought forward from time to time, no satisfactory solution has been found, heretofore, to eliminate the problem of erroneous AFC frequency correction signals arising when received modulating signals include continuous tones that are odd-harmonically related to the frequency at which the system is alternately switched between the modulated carrier frequency source and the reference source.

It is therefore an object of this invention to provide a sampling type frequency control system for automatically controlling the carrier frequency of an oscillator, said system being capable of eliminating error that occurs when received modulating signals contain continuous tones that are odd-harmonically related to the switching frequency used for comparison between a reference frequency and said carrier frequency.

More particularly, it is an object of this invention to provide a sampling type frequency control system for automatically controlling the carrier frequency of a high frequency oscillator, said system maintaining the phase of the odd-harmonics of the output signal from the switching oscillator shifted 90° with respect to corresponding odd-harmonically related continuous tones occurring in received signals used to modulate said high frequency oscillator.

With these and other objects in view which will become apparent to one skilled in the art as the description proceeds, this invention resides in the novel construction, combination and arrangements of parts substantially as hereinafter described and more particularly defined by the appended claims, it being understood that such changes in the precise embodiments of the herein disclosed invention may be included as come within the scope of the claims.

Figure 2:
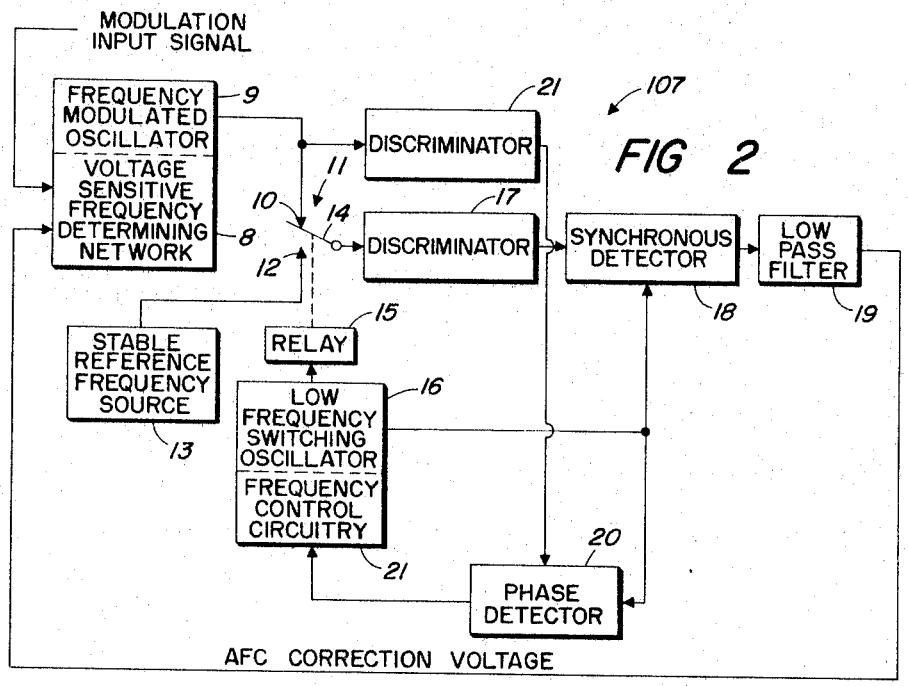
Figure 3:
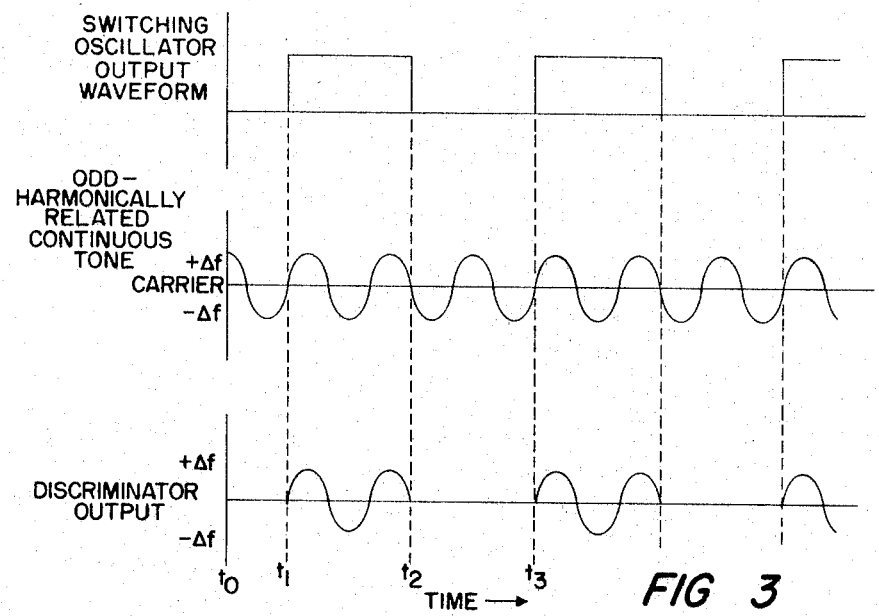
Figure 4:
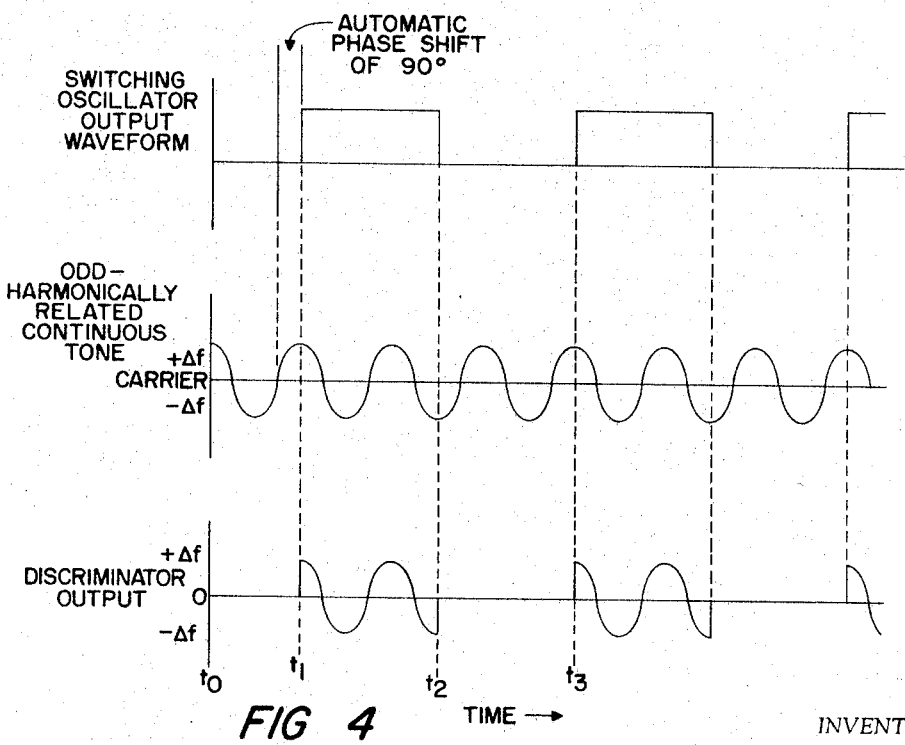

The accompanying drawings illustrate two complete examples of the embodiments of the invention constructed according to the best mode so far devised for the practical application of the principles thereof, and in which:

FIGURE 1 is a block diagram of the preferred embodiment of the frequency control system of this invention;
FIGURE 2 is a block diagram illustrating an alternate embodiment of the frequency control system of this invention;
FIGURE 3 illustrates a series of typical waveforms illustrating how error can occur when received modulating signals include a continuous tone that is odd-harmonically related to the switching frequency; and
FIGURE 4 presents a series of typical waveforms showing how the control circuit of this invention automatically eliminates any error due to the presence in received modulating signals of a continuous tone that is odd-harmonically related to the switching frequency.

Referring now to the drawings, the numeral 7 refers generally to the preferred embodiment of the frequency control system of this invention. As shown in FIGURE 1, the modulation input signal is coupled to voltage sensitive frequency determining network 8 of direct frequency modulated oscillator 9. Since the carrier frequency of the oscillator is determined by the voltage sensitive frequency determining network, as is well known in the art, direct frequency modulation occurs when the modulation input signal is coupled to the voltage sensitive frequency determining network 8. Network 8 may, for example, include a Varicap (not shown) as the voltage sensitive element.

The frequency modulated output signal from oscillator 9 is coupled to fixed contact 10 of switch 11. A second fixed contact 12 of switch 11 is, in turn, connected to a stable reference frequency source 13, which source produces an output signal having a frequency equal to the desired frequency to be maintained as the carrier frequency from frequency modulated oscillator 9.

Switch 11 has a movable contactor 14, which contactor is made to alternately close with fixed contacts 10 and 12 by means of relay 15 at a switching rate determined by low frequency switching oscillator 16, which oscillator is preferably a square wave oscillator. Switching oscillator 16 must have a frequency well below the lowest modulation frequency expected and can, for example, be as low as 5 cycles per second. It is to be realized, however, that the switching means shown herein is merely illustrative of one possible method of accomplishing switching, which could, for example, also be accomplished by means of an electronic switch.

Movable contactor 14 of switch 11 is connected to a discriminator 17, which discriminator alternately receives the frequency modulated output signal from high frequency oscillator 9 and the reference frequency from stable reference frequency source 13. During the half-cycle (of the switching frequency) when switch 11 couples the modulated signal from oscillator 9 to discriminator 17, the output from the discriminator, will of course, be the modulation signal originally used to frequency modulate the carrier signal.

The output from discriminator 17 is coupled to synchronous detector 18, which detector also receives the output signal from low frequency switching oscillator 16. As is conventional, synchronous detector 18 produces a D.-C. correction voltage if the reference frequency (from reference source 13) and the carrier frequency (from oscillator 9) are not identical. This D.-C. correction signal is then coupled through a low pass filter 19 back to the voltage sensitive frequency determining network 8 of oscillator 9 to correct the carrier frequency of the oscillator to eliminate the error voltage, as is well known in the art.

If the modulation input signal used to frequency modulate oscillator 9 includes a continuous tone that is odd-harmonically related to the switching frequency, an erroneous AFC correction voltage will be produced at the output of synchronous detector 18 unless the phase of the odd-harmonics of the output signal from switching oscillator 16 is shifted 90° with respect to corresponding odd-harmonics of said continuous tones. An erroneous AFC correction voltage would, of course, cause an undesirable shift in the carrier frequency of oscillator 9. This is shown by the typical waveforms shown in FIGURE 3 of the drawings. As shown, if the half-cycle of the switching frequency causing oscillator 9 to be connected to discriminator 17 occurs between the times $t_1$ and $t_2$, an in-phase odd-harmonically related continuous tone would cause a definite average discriminator output other than zero. As shown in FIGURE 3, this could, for example, be a positive output, which, when filtered, would cause an erroneous D.-C. correction voltage to be coupled back to oscillator 9 to indicate an oscillator frequency deviation which has, in fact, not occurred.

It has been found, however, that, as shown in FIGURE 1, if the output from discriminator 17 is also coupled to a phase detector 20 along with an output from low frequency switching oscillator 16, phase detector 20 will produce an output error voltage, which, if coupled to frequency determining network 21 of oscillator 16, will automatically eliminate any error that exists due to a continuous tone that is odd-harmonically related to the switching frequency.

This error elimination is due to the fact that the output from phase detector 20 automatically maintains the phase of the odd-harmonics of switching oscillator 16 shifted 90° with respect to corresponding continuous odd-harmonically related tones that might be present in the modulation input signal.

As shown in FIGURE 4 (and again assuming, as in the case of FIGURE 3, that the half-cycle during which oscillator 9 is connected to discriminator 17 is from time $t_1$ to $t_2$), by automatically shifting the switching frequency so that odd-harmonics are 90° out of phase with respect to corresponding odd-harmonically related tones of the modulation input signal (FIGURES 3 and 4 show third harmonic, for example) no erroneous error signal is produced. More specifically, the positive and negative portions of the discriminator output are equal when the system of this invention is utilized, as shown in FIGURE 4, and the system of this invention thus eliminates erroneous AFC correction voltages heretofore present in known systems that occurred when the received modulation signal included continuous tones odd-harmonically related to the switching, or sampling, frequency.

FIGURE 2 shows an alternate form of the control system of this invention and is designated generally by the numeral 107. The system shown in this embodiment is capable of overcoming maximum phase shift of the switching oscillator due to an output signal from phase detector 20 wherever oscillator 9 has, in fact, drifted in frequency. If a phase shift during this period should prove undesirable for any reason, then the embodiment of FIGURE 2 should be utilized.

As shown in FIGURE 2, the output signal from frequency modulated oscillator 9 is coupled through switch 11 to discriminator 17 in the same manner as that shown in FIGURE 1. However, the input to phase detector 20 is coupled, not from the output of discriminator 17, but from a second discriminator 21, which discriminator is directly connected to receive the frequency modulated output from frequency modulated oscillator 9. Thus, discriminator 21 constantly receives the modulation information from oscillator 9 rather than only during one alternation of the switching frequency as in the embodiment of FIGURE 1. This eliminates the maximum phase shift during the period when the AFC correction voltage is correcting oscillator 9 for frequency drift because of the separate channels utilized for each purpose.

It should be obvious from the foregoing that the novel system of this invention provides a heretofore unavailable means for eliminating error that can occur in a sampling type automatic frequency control system if the modulation input signal has a continuous tone that is odd-harmonically related to the sampling frequency.

What is claimed as my invention is:

1. A system for automatically controlling the carrier frequency provided by a high frequency oscillator, which carrier frequency is modulated by received modulating signals, and which oscillator includes a voltage sensitive frequency determining network, said system comprising: a reference source providing an output signal having a reference frequency equal to the desired carrier frequency to be maintained; a demodulator; switching means for alternately coupling said modulated carrier frequency and said reference frequency to said demodulator, said switching means including a switching oscillator determining the switching frequency; means connected to receive the output from said demodulator and develop a correction voltage if said carrier frequency is not equal to said reference frequency and if said received modulating signals are such as to cause a continuous tone that is odd-harmonically related and shifted other than 90° with respect to the corresponding odd-harmonic of said switching frequency; means for coupling said developed correction voltage to the voltage sensitive frequency determining network of said high frequency oscillator to cause a shift in the carrier frequency; means including a phase detector for receiving said frequency modulated output signal after demodulation and said switching frequency, said phase detector producing an error voltage only if said continuous tone that is odd-harmonically related to said switching frequency occurs shifted other than 90° with respect to the corresponding odd-harmonic of said switching frequency; and means for coupling said error voltage from said phase detector to said switching oscillator to control the phase of the output signal therefrom.

2. A system for automatically controlling the carrier frequency of a high frequency oscillator providing a frequency modulated output signal, said high frequency oscillator having a voltage sensitive frequency determining network establishing said carrier frequency and being frequency modulated by received modulating signals, said system comprising: a reference source providing an output signal having a reference frequency equal to the desired carrier frequency to be maintained; a discriminator; switching means for alternately connecting said high frequency oscillator and said reference frequency source to said discriminator, said switching means including a switching square wave oscillator determining the switching frequency; a synchronous detector connected to receive the output from said discriminator and said switching oscillator, said synchronous detector providing a correction signal if said carrier frequency is not equal to said reference frequency and if said received modulating signal included a continuous tone that is odd-harmonically related and shifted other than 90° with respect to the corresponding odd-harmonic of said switching frequency; means for receiving said correction signal from said synchronous detector and coupling the same to the voltage sensitive frequency determining network of said high frequency oscillator to cause an adjustment in the carrier frequency; error determining means including a phase detector connected to receive a discriminated output from said high frequency oscillator and the square wave output from said switching oscillator, said phase detector producing error voltage only if said continuous tone that is odd-harmonically related to said switching frequency occurs shifted other than 90° with respect to the corresponding odd-harmonic of said switching frequency; and means for coupling the error voltage from said phase detector to said switching oscillator to control the phase of the output signal therefrom.

3. The system of claim 2 wherein said error determining means receives the output signal from said discriminator and includes means for coupling said discriminator output to said phase detector.

4. The system of claim 2 wherein said error determining means includes a second discriminator connected directly to said high frequency oscillator to receive the frequency modulated output therefrom, and means for coupling the output from said second discriminator to said phase detector.

5. The system of claim 2 wherein said switching means is switched at a very slow rate relative to said reference frequency.

6. The system of claim 5 wherein said low switching rate is five cycles per second.

No references cited.

KATHLEEN H. CLAFFY, *Primary Examiner.*

R. LINN, *Assistant Examiner.*